(12) United States Patent
Conrad (10) Patent No.: US 11,466,878 B2
(45) Date of Patent: Oct. 11, 2022

(54) OXYGEN ENHANCEMENT OF A ROOM AND HVAC SYSTEM FOR SAME

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 0 days.

(21) Appl. No.: 17/121,880

(22) Filed: Dec. 15, 2020

(65) Prior Publication Data

US 2022/0186955 A1 Jun. 16, 2022

(51) Int. Cl.
| | |
|---|---|
| *B01D 53/04* | (2006.01) |
| *B01D 50/00* | (2022.01) |
| *B01D 46/00* | (2022.01) |
| *F24F 8/60* | (2021.01) |
| *F24F 11/30* | (2018.01) |
| *B01D 53/047* | (2006.01) |
| *F24F 8/10* | (2021.01) |
| *F24F 3/16* | (2021.01) |

(52) U.S. Cl.
CPC ............ *F24F 8/60* (2021.01); *B01D 46/0002* (2013.01); *B01D 50/00* (2013.01); *B01D 53/04* (2013.01); *B01D 53/047* (2013.01); *B01D 53/0446* (2013.01); *F24F 3/16* (2013.01); *F24F 8/10* (2021.01); *F24F 11/30* (2018.01); *B01D 2253/108* (2013.01); *B01D 2256/12* (2013.01); *B01D 2257/102* (2013.01); *B01D 2259/4508* (2013.01); *B01D 2259/4541* (2013.01)

(58) Field of Classification Search
CPC ...... B01D 53/04; B01D 53/047; B01D 50/00; B01D 46/0002
See application file for complete search history.

(56) References Cited

U.S. PATENT DOCUMENTS

| | | | |
|---|---|---|---|
| 6,217,634 B1 | 4/2001 | Dominelli et al. | |
| 8,157,892 B2 * | 4/2012 | Meirav | F24F 3/16 95/96 |
| 11,110,387 B2 * | 9/2021 | Meirav | B01D 46/62 |

FOREIGN PATENT DOCUMENTS

WO 2020/024044 A1 2/2020

* cited by examiner

*Primary Examiner* — Robert A Hopkins
(74) *Attorney, Agent, or Firm* — Philip C. Mendes da Costa; Bereskin & Parr LLP/S.E.N.C.R.L., s.r.l.

(57) ABSTRACT

An HVAC system having a fan coil and an oxygen concentrator.

15 Claims, 9 Drawing Sheets

OXYGEN ENHANCEMENT OF A ROOM AND HVAC SYSTEM FOR SAME

FIELD

This application relates generally to the field of room ventilation and air treatment systems for same.

INTRODUCTION

The following is not an admission that anything discussed below is part of the prior art or part of the common general knowledge of a person skilled in the art.

A fan coil is a component part of many residential, commercial, and industrial heating, ventilation and air conditioning (HVAC) systems, which provides treated (e.g., heated and/or cooled) air to a room in which they are installed or to multiple rooms. A fan coil comprises a heating and/or cooling heat exchanger and a fan. Air to be heated or cooled is introduced into the heat exchanger and cooled or heated by ambient air that is to be exhausted from the room. The fan coil may be controlled automatically by a thermostat which may activate the fan coil as required to maintain a set air temperature in the room

SUMMARY

In accordance with one aspect of this disclosure, a ventilation system is provided comprising an air treatment apparatus (e.g., a fan coil), which is operable to move air within a volume (e.g., a room in a house, a house, a condominium, a factory, office space or the like) and an oxygen concentrator operable in an oxygen enrichment mode to enhance the level of oxygen in air which exits the air treatment apparatus and is introduced into the volume. Optionally, the oxygen concentrator may transfer oxygen from air which is to be exhausted from the volume (exhaust air) and deliver at least some of that oxygen to the air that is to be outputted from the air treatment apparatus. For example, a fan coil may include an air-to-air heat exchanger and part of the return air may be exhausted as exhaust air. Oxygen may be removed from the exhaust air and delivered to the return air that is to be outputted from the air treatment apparatus into the volume. An advantage of this design is that the air that is outputted from the air treatment apparatus may be enriched with oxygen from the exhaust air, thereby recycling oxygen from the exhaust air.

In accordance with this aspect, there is provided an HVAC system comprising:
 a) a fan coil having an exhaust air outlet port through which exhaust air exits the fan coil and an air inlet port through which input air enters the fan coil; and,
 b) an oxygen concentrator operable in an oxygen enrichment mode to transfer oxygen from the exhaust air and deliver the oxygen to the input air.

In any embodiment, the oxygen concentrator may be a regenerable oxygen concentrator.

In any embodiment, the oxygen concentrator may be a pressure swing adsorption oxygen concentrator.

In any embodiment, in the oxygen enrichment mode, the oxygen concentrator may adsorb nitrogen from the exhaust air using a molecular sieve thereby providing oxygen enriched air and the oxygen enriched air may be combined with the input air.

In any embodiment, the oxygen concentrator may also be operable in a regeneration mode wherein the nitrogen is desorbed from the molecular sieve.

In any embodiment, fan coil may be part of a HRV or ERV unit and the oxygen concentrator may be part of the HRV or ERV unit.

In any embodiment, the HVAC system may further comprise an oxygen sensor operably connected to the oxygen concentrator whereby the oxygen concentrator may be actuated when the oxygen sensor detects an oxygen level below a predetermined level.

In any embodiment, the oxygen concentrator may be deactivated when the oxygen sensor detects an oxygen level above a predetermined level.

In any embodiment, the oxygen concentrator may be connected in flow communication with the exhaust air outlet port and the input air inlet port.

In any embodiment, the oxygen concentrator may receive a bleed stream of the exhaust air.

In any embodiment, the fan coil may include a heat exchanger and the oxygen concentrator may be connected in flow communication with the input air upstream of the heat exchanger.

In any embodiment, the HVAC system may further comprise a filter positioned upstream of the oxygen concentrator.

In accordance with another aspect of this disclosure, an air treatment apparatus for an enclosed living space is providing having an air flow path extending from an air inlet to an air outlet with an oxygen concentrator in the air flow path. The oxygen concentrator is operable in an oxygen enrichment mode for removing nitrogen from air entering the air inlet of the air treatment apparatus and a regeneration mode for purging the nitrogen captured by the oxygen concentrator to a location exterior to the living space. An advantage of this design is that the oxygen concentration of stale air entering the air treatment apparatus may be increased before it is returned to the enclosed space, thereby improving the air quality of the living space.

In accordance with this aspect, there is provided an air treatment apparatus for an enclosed living space comprising an air flow path extending from an air inlet to an air outlet with an oxygen concentrator and an air moving member provided in the air flow path, wherein the oxygen concentrator is operable in an oxygen enrichment mode in which nitrogen is removed from air entering the air inlet and oxygen enriched air is exhausted from the air outlet and the oxygen concentrator is also operable in a regeneration mode wherein the nitrogen that was removed from air entering the air inlet is exhausted at a location exterior to the living space.

In any embodiment, the apparatus may be portable whereby the apparatus may be operated in the oxygen enrichment mode when located in the living space and the apparatus may be operated in the regeneration mode when located exterior to the living space.

In any embodiment, the apparatus may have an inlet conduit which may extend from a location exterior to the living space to the air inlet whereby, in the oxygen enrichment mode, fresh air may be drawn into the inlet conduit from exterior to the living space and oxygen enriched air may exit the air outlet to the living space.

In any embodiment, the apparatus may have an outlet conduit which extends from an exhaust outlet to a location exterior to the living space whereby, in the regeneration mode, nitrogen that was removed from air entering the inlet conduit may be exhausted through the outlet conduit to the location exterior to the living space.

In any embodiment, the HVAC system may further comprise a filter positioned upstream of the oxygen concentrator.

In any embodiment, the HVAC system may further comprise a wall mount or a window mount.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method, or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used herein and in the claims, two elements are said to be "parallel" where those elements are parallel and spaced apart, or where those elements are collinear.

General Description of a Fan Coil

The following is a general description a fan coil for use in an HVAC system.

Figure 1:
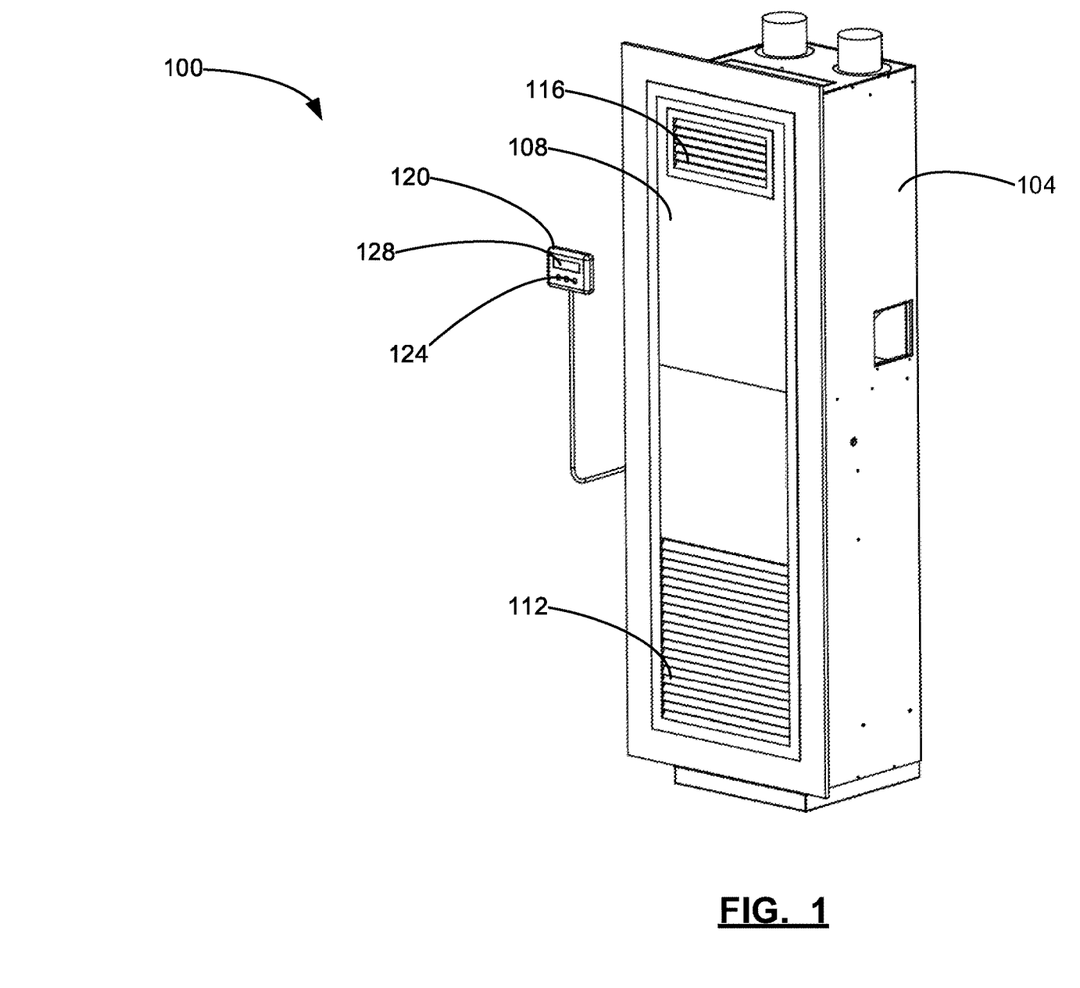
FIG. 1 is a front perspective view of a fan coil of an HVAC system.
Figure 2:
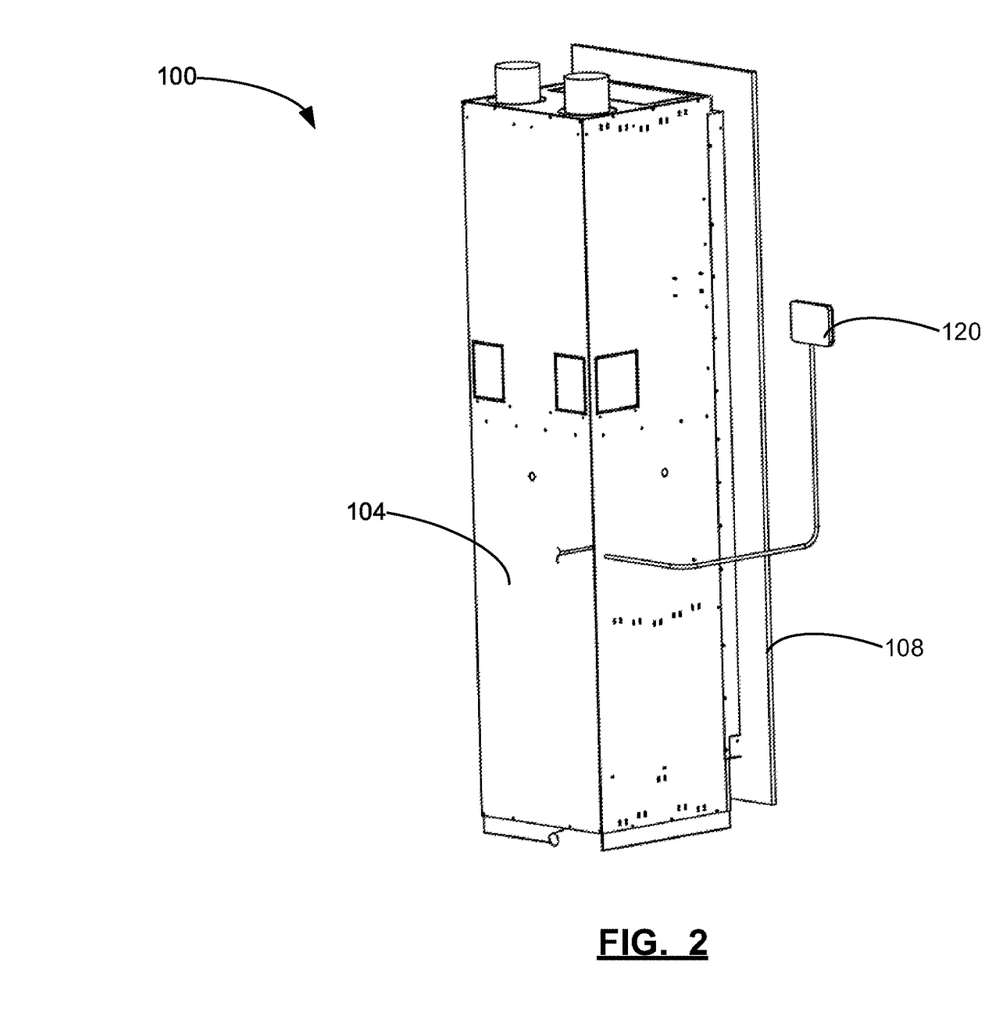
FIG. 2 is a rear perspective view of the fan coil of FIG. 1.

FIGS. 1 and 2 exemplify the use of a fan coil 100, as an oxygen enrichment apparatus. In the illustrated example, fan coil 100 includes a housing 104 including a front face 108 defining an air inlet 112 and an air outlet 116. The fan coil 100 is operable to receive air from air inlet 112, heat or cool the air introduced from inlet 112 and optionally, in addition or alternately, humidify the air, and discharge the treated air through air outlet 116 into a volume. The volume may be a room (e.g., a room in a house), a house, a condominium, a factory, office space or the like). For convenience, the volume is referred to herein as room 300.

The example shown includes a housing 104 that is substantially cuboid (i.e. box-shaped). An advantage of this design is that it provides an efficient and convenient form factor for applications where the fan coil 100 is recessed into a flat wall. However, in alternative embodiments, fan coil housing 104 can have any size and shape best suited for the intended application.

In the example shown, the fan coil inlet and outlet 112 and 116 are formed in the front face 108 of the fan coil housing 104. This design provides an efficient self-contained apparatus 100 that can be easily accommodated into a room design. However, in alternative embodiments, the fan coil inlet 112, the fan coil outlet 116, or both may be located remotely from the fan coil housing 104. For example, the fan coil inlet 112 and the fan coil outlet 116 may be fluidly connected to the fan coil housing 104 by one or more airflow conduits to allow the fan coil 100 to service one or more rooms remote from the fan coil 100 (e.g., via ducting built into a wall or ceiling of a building). In accordance with such an example, the fan coil may be a furnace for a house, factory, office building or the like. In some embodiments, fan coil 100 may include a plurality of fan coil air inlets 112, a plurality of fan coil air outlets 116, or a plurality of fan coil air inlets 112 and a plurality of fan coil air outlets 116. For example, fan coil 100 may include a plurality of fan coil air outlets 116 directed to different rooms. This allows one fan coil 100 to service several rooms.

Still referring to FIGS. 1 and 2, an air regulating device 120 is shown connected to fan coil 100. The air regulating device 120 may operate as a thermostat and/or a hygrostat, capable of sensing air temperature and/or air humidity, and signaling the fan coil 100 to generate heated, cooled and/or humidified air in order to maintain the room air at a set temperature and/or humidity.

For example, the air regulating device 120 may be programmed to maintain the room air at 21° C. and 40% relative humidity for comfortable human occupancy. Air regulating device 120 can be any thermostat and/or hygrostat device known in the art and may be connected to the fan coil by any means (e.g., wires, Wi-Fi, Bluetooth, or the like). In the illustrated embodiment, air regulating device 120 includes inputs 124 for user interaction (e.g. buttons to enter a set air temperature and relative humidity), and an optional display 128 (e.g. to display the current air temperature and relative humidity).

Figure 3:
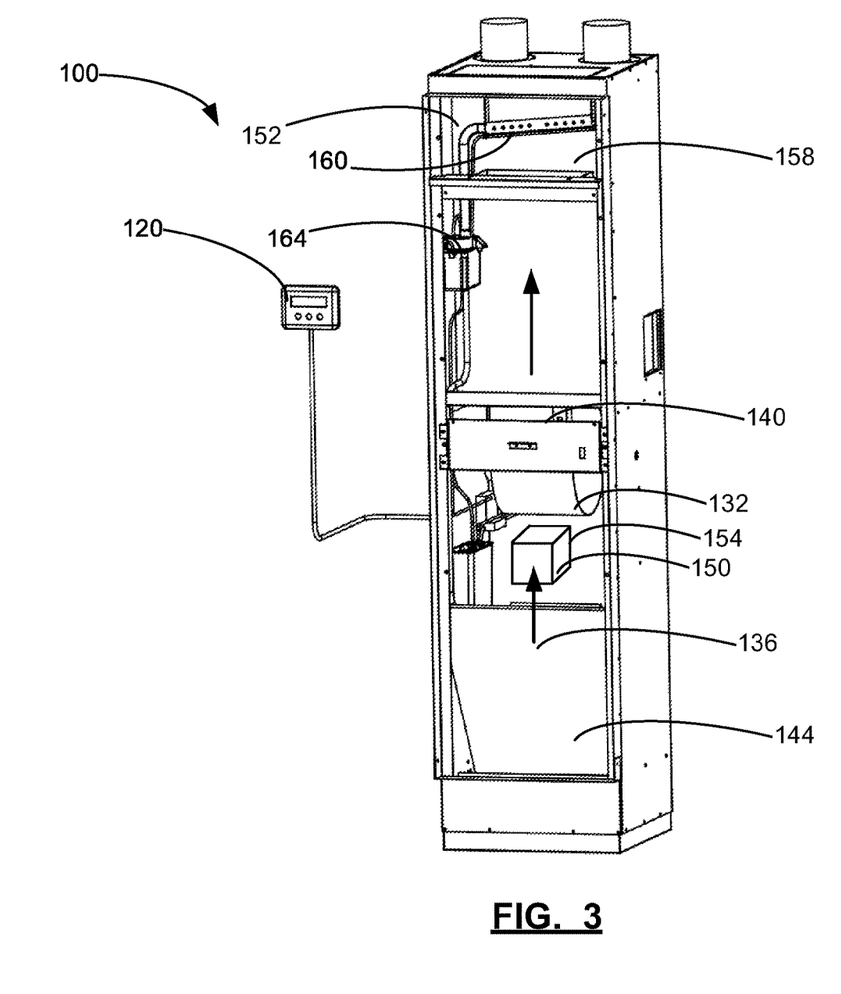
FIG. 3 is a front perspective view of the fan coil of FIG. 1 with the front panel removed.
Figure 4:
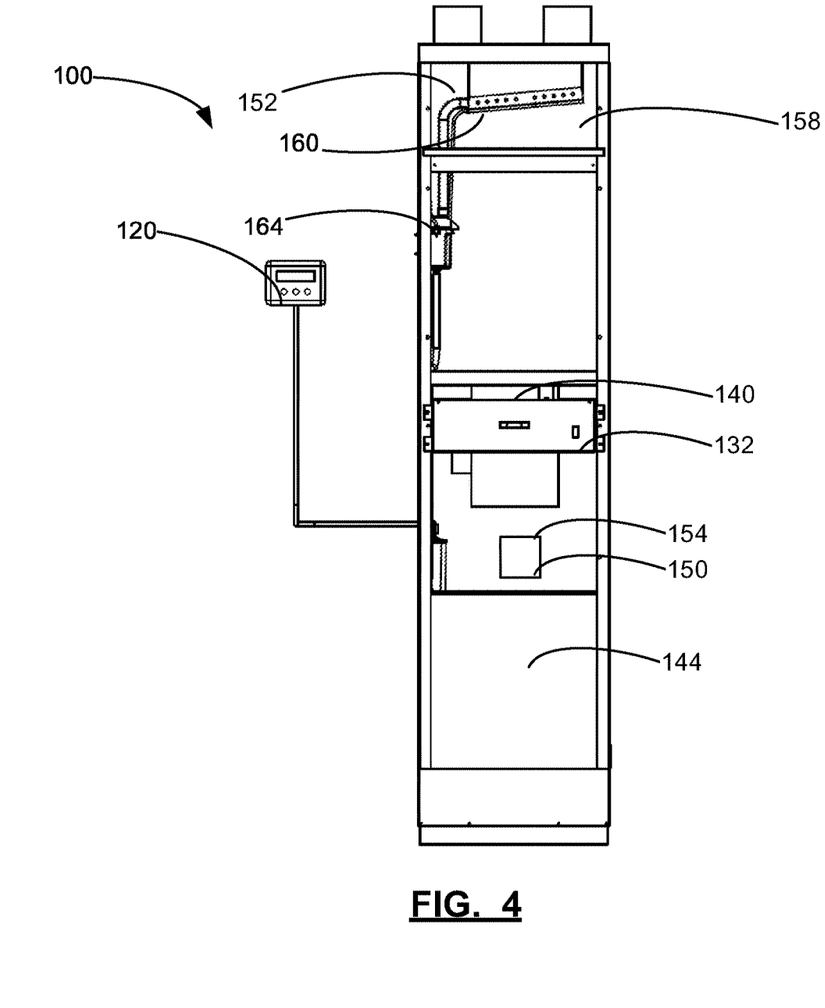
FIG. 4 is a front view of the fan coil of FIG. 1 with the front panel removed so as to show the interior of the fan coil.

Reference is now made to FIGS. 3-4 which shows fan coil 100 with front face 108 (FIG. 1) removed so that some of the internal components are visible. It will be appreciated that the fan coil may be of any design known in the art and may use any flow path, and any heating unit and/or air conditioning unit and/or dehumidification unit known in the heating and cooling arts. As exemplified, fan coil 100 includes an air moving member 132 (e.g., a blower) and an air flow path 136 which extends the air inlet 112, through the temperature regulation (e.g., heating) zone 150 having a heat exchanger 154, through the air moving member 132, and from the air moving member outlet 140 through the humidification zone 158 to the fan coil air outlet 116.

As exemplified in FIGS. 3 and 4, fan coil 100 is shown including a humidification unit 164 having a humidification outlet tube 160 for humidifying air in the fan coil air flow path 136 so that humidified air is discharged from fan coil air outlet 116. When air is heated in heating zone 150, the relative humidity of the air may decrease. The humidity added by humidification unit 164 can help to maintain or increase the relative humidity of the air after heating, such as to attain or maintain a set humidity programmed into air regulating device 120.

It will be appreciated that the forgoing is a general description of a type of air treatment apparatus. The following discussion relating to the oxygen enhancement of air in a living space may be used with any HVAC system and the discussion refers to a fan coil as only an exemplary embodiment.

Oxygen Concentrator

In accordance with this disclosure, the fan coil 100 is in air flow communication with an oxygen concentrator 200. The oxygen concentrator 200 operates to increase the concentration of oxygen in the air that is delivered to a room (e.g., before it is exhausted from the fan coil 100). An advantage of this aspect is that the quality of air exhausted into a room 300 from the fan coil 100 may be improved.

As exemplified in FIGS. 5-8, the fan coil 100 includes an oxygen concentrator 200. The oxygen concentrator 200 is operable in an oxygen enrichment mode in which the concentration of oxygen exhausted from the fan coil 100 to the room 300 is increased. When the oxygen concentrator is operating in the oxygen enrichment mode, as exemplified in FIGS. 5 and 7 the oxygen concentrator 200 transfers oxygen from the exhaust air and delivers the oxygen to air that is to be exhausted from outlet 116. Accordingly, conditioned input air (air which has been heated or cooled and/or humidified and/or filtered, but which has an increased level of oxygen) is exhausted through the air outlet 116 into the room 300.

It will be appreciated that the fan coil may incorporate the oxygen concentrator 200 or the oxygen concentrator 200 may be remote therefrom. For example, the oxygen concentrator 200 may be provided in an exhaust air stream that has exited, or is to exit, the fan coil 100 and oxygen recovered from the exhaust air by the oxygen concentrator 200 may be delivered to the room 300, e.g., by being added to air flowing through an air flow conduit that is part of an HVAC system and/or by being delivered to the room but a separate oxygen enhanced air flow conduit.

It will be appreciated that the oxygen may be obtained from any air stream that is to not be recycled to the room 300 and the oxygen separated from the air stream by the oxygen concentrator may be returned to the room by itself or added to an air stream that is to be delivered to the room 300.

It will also be appreciated that the oxygen concentrator 200 may be any device that is capable of increasing the oxygen concentration in an airflow, e.g., by isolating (e.g., adsorbing) oxygen in an air stream that is to not be recycled to the room 300. For example, the oxygen concentrator 200 may be a pressure swing adsorption oxygen concentrator. A pressure swing adsorption oxygen concentrator operates by using an adsorbent material as a trap for gases at high pressure. For example, when air is passed through zeolite, nitrogen is removed from the air and adsorbed into the zeolite. The remaining air thus has a higher concentration of oxygen due to the removed nitrogen.

Accordingly, in the case of a pressure swing oxygen concentrator operating in the oxygen enrichment mode, the oxygen concentrator 200 adsorbs nitrogen from the air (e.g., exhaust air) using the adsorbent material, thereby providing oxygen enriched air. The oxygen enriched air may then be combined with the input air (e.g., entering via inlet 112) before exiting the fan coil 100. It will be appreciated that the adsorbent material may be any material capable of adsorbing a component of air to provide oxygen or oxygen enriched air. For example, the adsorbent material may be, including but not limited to, zeolites, activated carbon, and/or a molecular sieve.

In some embodiments, the oxygen concentrator 200 may have a plurality of molecular sieves. Increasing the number of molecular sieves may improve the speed and efficiency of nitrogen removal from the exhaust air.

In some embodiments, the oxygen concentrator 200 may be a regenerable oxygen concentrator. Once the adsorbent material has reached a certain adsorbency level, the adsorbent material may be regenerated by reducing the pressure in the oxygen concentrator 200, thereby allowing the release of the trapped elements. Accordingly, the oxygen concentrator 200 may be operable in a regeneration mode, as exemplified in FIGS. 6 and 8. When in the regeneration mode, the nitrogen that was adsorbed by the adsorbent material during the oxygen enrichment mode is desorbed from the adsorbent material. The desorbed nitrogen may then be exhausted from the HVAC system to an exterior area 310.

It will be appreciated that the input air to the fan coil 100 may be recirculated air from the volume (e.g., room) that is to be conditioned by the fan coil (e.g., air that enters through air inlet 112) and/or fresh air from an external source (e.g., external to a building or a condominium or a house).

Optionally, recirculated air is combined with fresh air. The fresh air may be combined with the recirculated air at any location in the HVAC system (e.g., in the fan coil) as the air passes through the HVAC system (e.g., the fan coil) and, optionally, upstream of the temperature control zone 150.

Optionally, some or all of the air that is drawn from room 300 to the fan coil may be exhausted from the room 300. Air that enters the fan coil 100 through air inlet 112 and is exhausted to an external source is referred to as exhaust air. Accordingly, some of the input air that enters through air inlet 112 (e.g., a bleed stream of the input air) may be exhausted as exhaust air and the remainder may be recirculated to the room 300 through air outlet 116.

It will be appreciated that the amount of fresh air and the amount of exhaust air may be about the same and optionally only up to 5%, 10%, 15%, 20% or 25% of the recirculated air may be exhausted from the room 300 and replaced by fresh air. It will be appreciated that the air that is to be exhausted may be referred to as a bleed air stream.

In such an embodiment, at least some of the bleed air is passed through the oxygen concentrator 200. If the oxygen concentrator 200 is a pressure swing oxygen concentrator, then nitrogen is removed from the bleed air stream passing through the oxygen concentrator 200 and a stream of conditioned air having an increased oxygen concentration is produced. The conditioned air may be combined with the input air (the recirculated air and/or fresh air), before being exhausted through air outlet 116. Accordingly, oxygen from air that would have been exhausted is transferred to the input air, thereby increasing the oxygen concentration of the air, before being output through air outlet 116 into room 300. It will be appreciated that the conditioned air may be introduced to the HVAC system at any location in the fan coil or upstream or downstream thereof.

Figure 5:
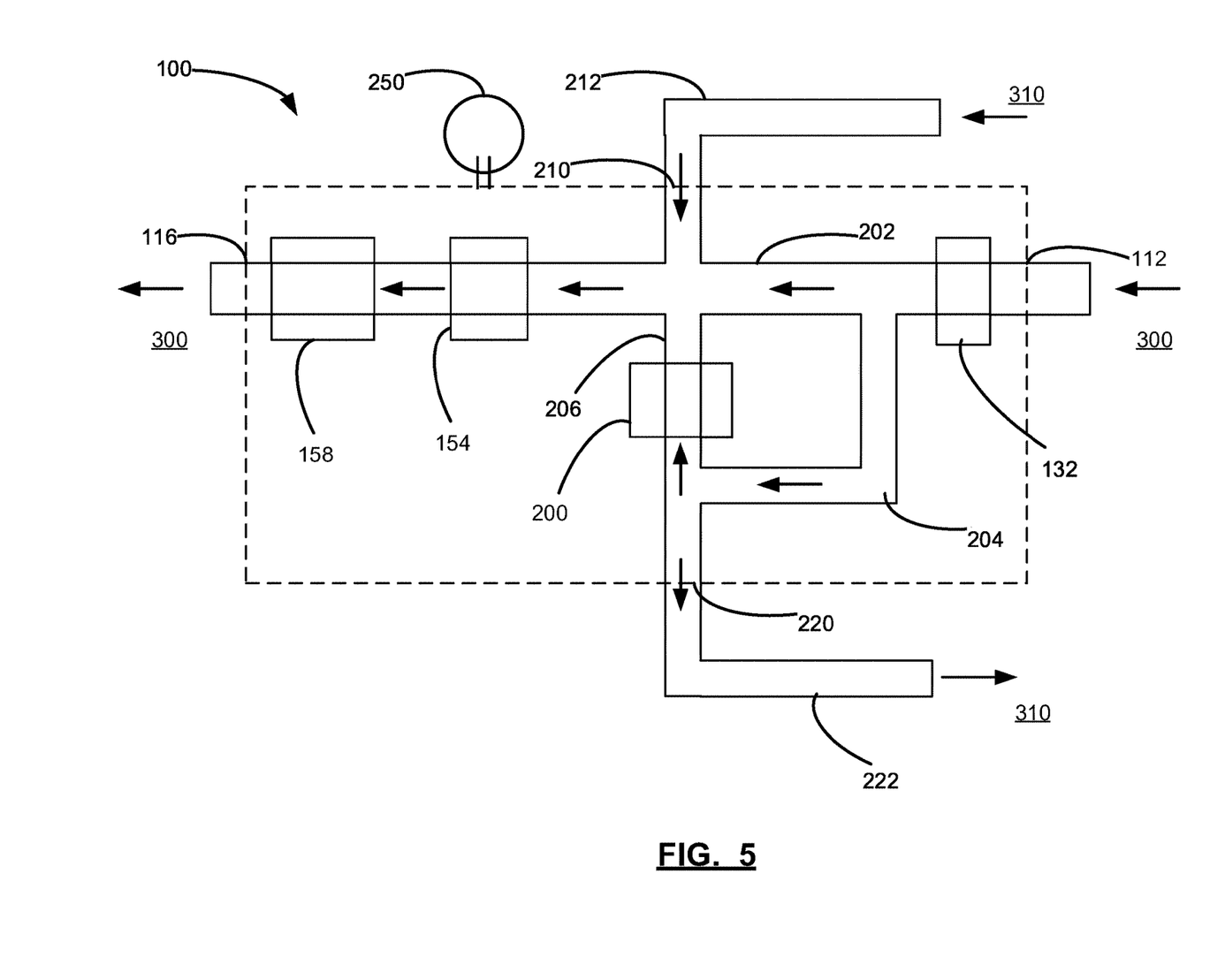
FIG. 5 is a schematic drawing of a fan coil with an oxygen concentrator operating in an oxygen enhancement mode.
Figure 6:
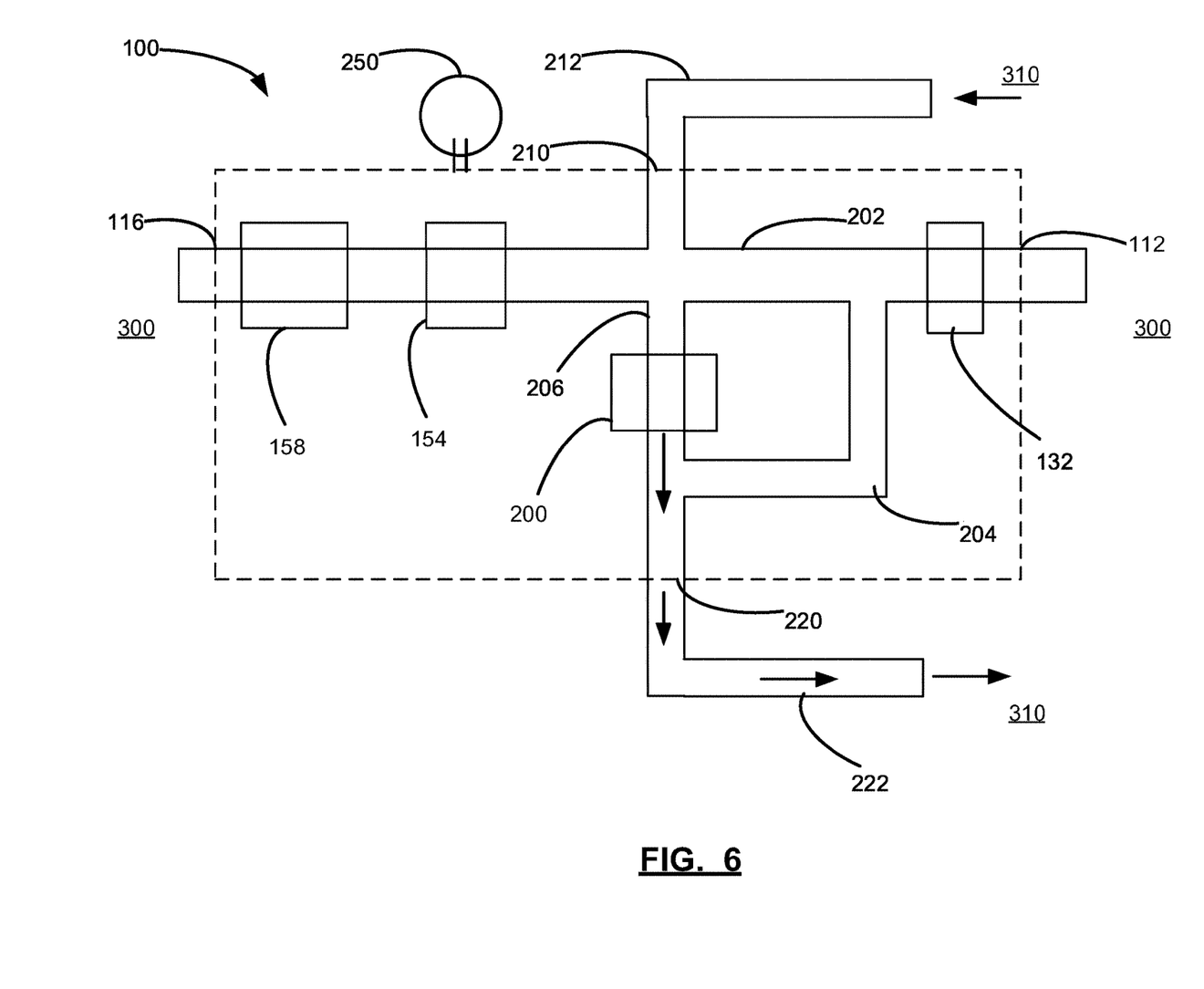
FIG. 6 is a schematic of the fan coil of FIG. 5 operating in a regeneration mode; and, FIG. 7 is a schematic of another fan coil with an oxygen concentrator operating in an oxygen enhancement mode.

As exemplified in FIG. 5, the fan coil 100 has an air inlet 112, an air outlet 116, a fresh air inlet port 210, and an exhaust air outlet port 220. The oxygen concentrator 200 is in flow communication with the exhaust air outlet port 220 and the fresh air inlet port 210. As shown, some of the input air (a bleed air stream) that enters through air inlet 112 enters bleed air conduit 204 and is passed through the oxygen concentrator 200, and some of the bleed air is exhausted through the exhaust air outlet port 220. The air that passes through the oxygen concentrator 200 forms conditioned air that passes through conditioned air conduit 206 and is combined with the fresh air that enters through fresh air inlet port 210, and the combined conditioned air is output through air outlet 116.

Optionally, as exemplified in FIG. 5, at least a portion of the input air that enters through the air inlet 112 may bypass the oxygen concentrator 200 and may be recirculated out through air outlet 116 into room 300. As exemplified in FIG. 5, a bypass conduit 202 allows input air from the air inlet 112 to bypass the oxygen concentrator 200 and to optionally be combined with the fresh air from the fresh air inlet port 210. Accordingly, oxygen enhanced air produced by oxygen concentrator 200 may be combined with both the fresh air that enters through fresh air inlet port 210 and the recirculated input air that entered through air inlet 112 that was not conditioned or exhausted. The combined conditioned air is then output through air outlet 116. In other words, the oxygen concentrator 200 may be in flow connection with the exhaust air by way of a bleed stream passing through bleed air conduit 204. The amount of exhaust air that is bled into the oxygen concentrator 200 may be controlled (e.g., by a valve) to vary the amount of conditioned air added to the input air. Accordingly, a valve or the like may be partially opened or closed to vary the ratio of bleed air in conduit 204 that is fed to the oxygen concentrator 200 and to the outlet port 220.

It will be appreciated that the relative flows in the fan coil 100 may be controlled by any means. For example, each conduit within the fan coil 100 may have one or more valves that are controllable to vary the flow rate into the air inlet 112, out of the air outlet 116, into the fresh air inlet port 210, out of the exhaust air outlet port 220, into the bleed air conduit, into the oxygen concentrator 200, and/or into the bypass conduit 202. Accordingly, the flow rate between each of the inlets and outlets may be controllable to vary the amount of air that is conditioned by the oxygen concentrator 200 before being output to the room 300.

Figure 7:
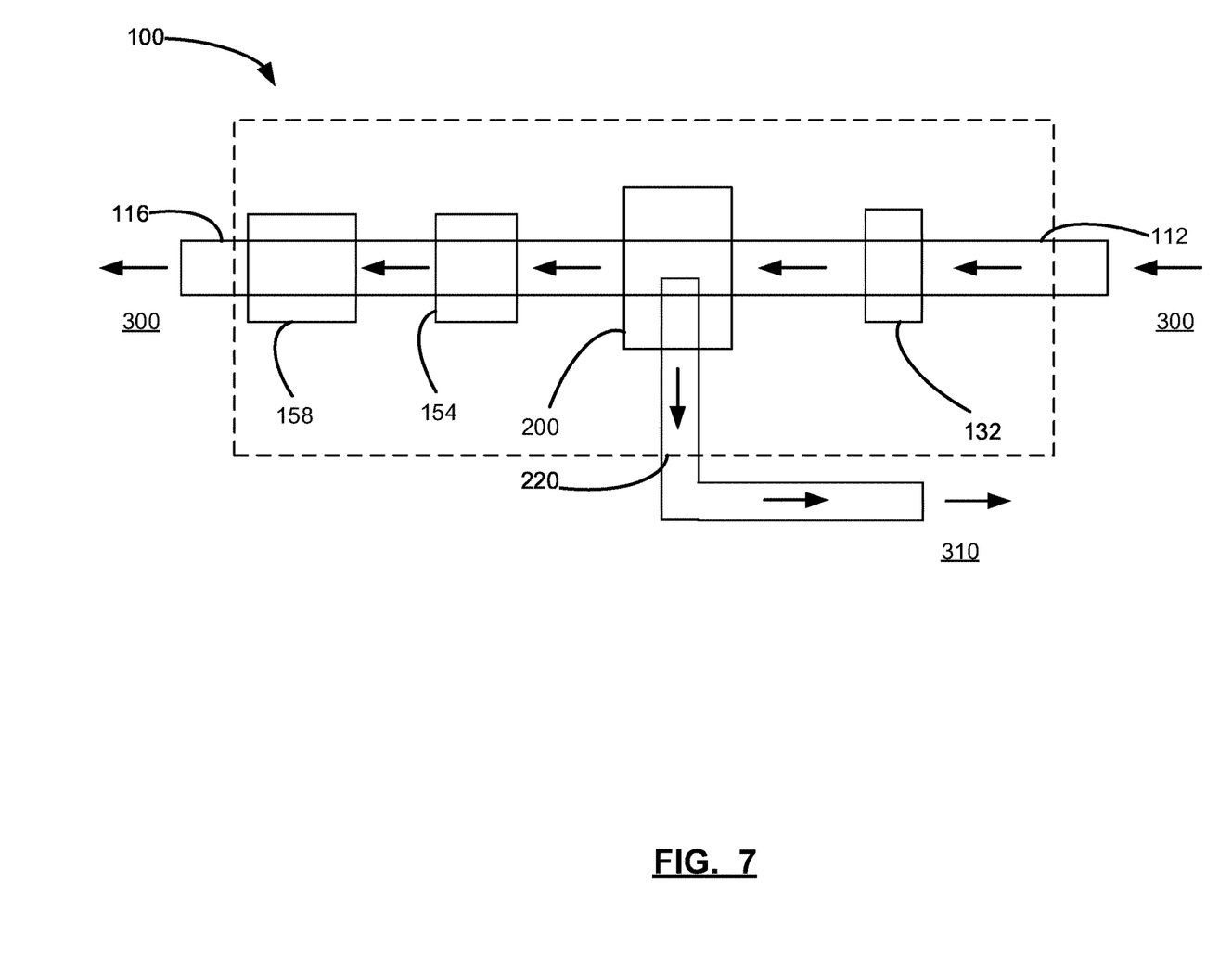
Figure 8:
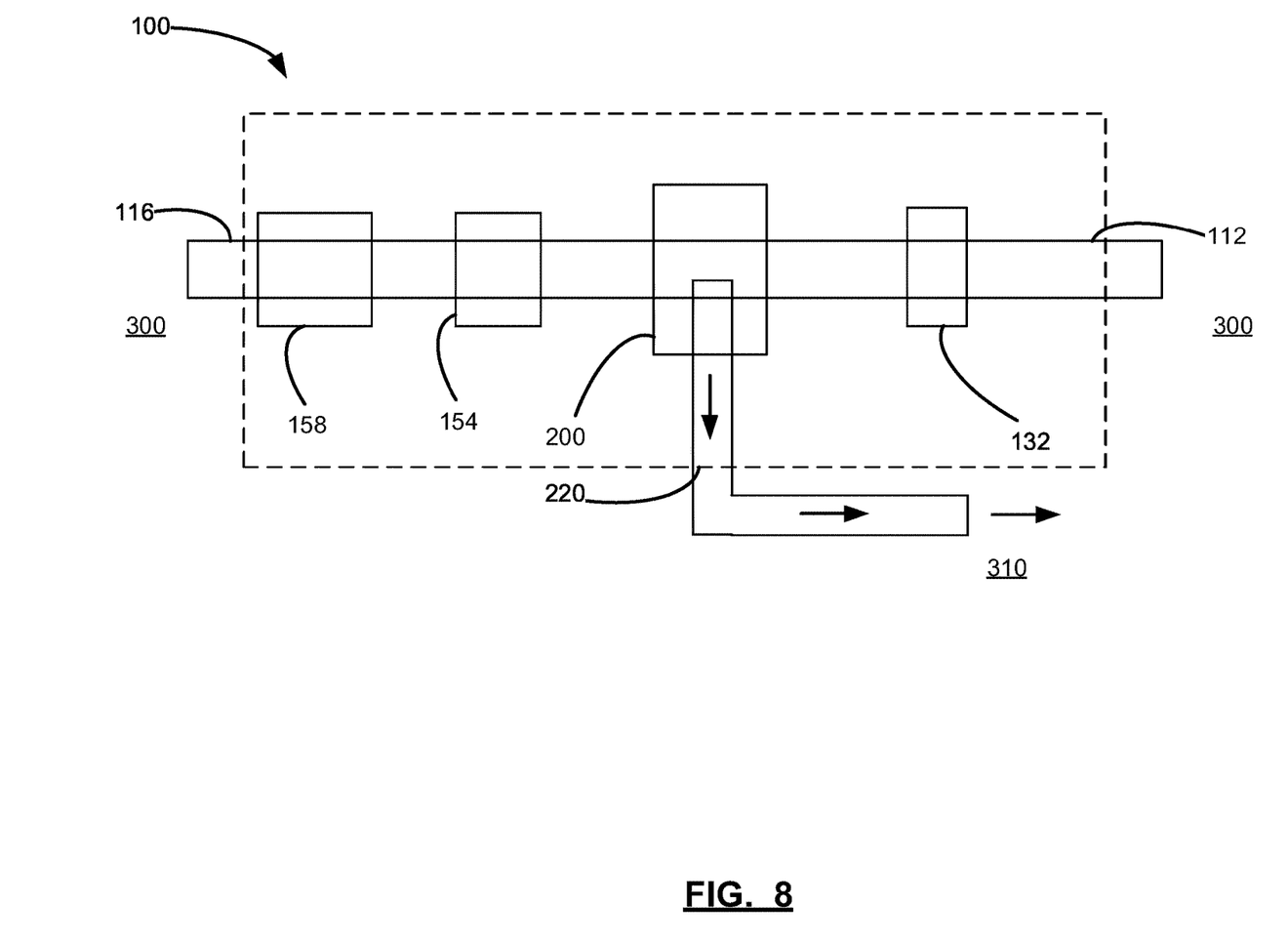
FIG. 8 is a schematic of the fan coil of FIG. 7 operating in a regeneration mode; and, FIG. 9 is a schematic drawing of a portable oxygen enrichment apparatus 400.

Alternately, as exemplified in Figured 7 and 8, a bypass conduit 202 may not be provided. In accordance with such an embodiment, all of the air entering inlet 112 is delivered to the oxygen concentrator 200.

In some embodiments, the flow rates within the fan coil 100 may be automatically controlled. For example, as exemplified in FIGS. 5-6, the fan coil 100 may include an oxygen sensor 250. The oxygen sensor 250 may be operably connected to the oxygen concentrator 200 and/or one or more valves (e.g., a valve controlling flow to the oxygen concentrator 200) such that the oxygen concentrator 200 is actuated and/or air is flowed through the oxygen concentrator 200 and/or the amount of air provided to the oxygen concentration 200 is increased when the oxygen sensor 250 detects an oxygen level (e.g., at a location in the volume or in the air in the fan coil upstream of the oxygen concentrator 200) below a predetermined level. Similarly, when the oxygen sensor 250 detects an oxygen level above a predetermined level, the oxygen concentrator 200 may be deactivated and/or the flow of air through the oxygen concentrator 200 may be reduced or stopped. Accordingly, the air regulating device 120 may use (and may optionally incorporate) the oxygen sensor 250 to control flow rate into the oxygen concentrator 200 from the input air that enters the air inlet 112 in order to vary the amount of oxygen that is transferred from the exhaust air to the input air.

In some embodiments, the fan coil 100 may include a filter positioned upstream of the oxygen concentrator 200. Positioning the filter upstream of the oxygen concentrator 200 may improve the operation of the oxygen concentrator 200 by removing contaminates from the air prior to the air entering the oxygen concentrator 200, thereby improving the quality of air and increasing the life cycle of the oxygen concentrator 200.

In some embodiments, as exemplified in FIGS. 3-4, the fan coil 100 may include a heat exchanger 154. The oxygen concentrator 200 may be connected in flow communication the air flow path 136 (e.g., with the fresh air) upstream of the heat exchanger 154. Connecting the oxygen concentrator 200 to the air flow path 136 upstream of the heat exchanger 154 allows the conditioned air to be heated or cooled along with the optional fresh air. Furthermore, the upstream connection may more efficiently transfer heat to air that will be delivered to the room 300, without wasting energy by heating air that is to be exhausted. Similarly, the nitrogen that is removed from the air in the oxygen concentrator 200 is not heated or cooled, thereby saving energy.

For example, as exemplified in FIGS. 3-4, the air flow path 136 may include a temperature regulation zone 150 between an upstream first portion 144 of fan coil air flow path 136, and a downstream second portion 152 of fan coil air flow path 136. The temperature regulation zone 150 can include any heat exchanger 154 capable of heating and/or cooling the air moving downstream across the temperature regulation zone 150. For example, the heat exchanger 154 can include any heating or cooling apparatus such as resistive heating elements, a natural gas burner, air conditioning, or the like. In some embodiments, the air heating device 154 includes a heat recovery ventilator (HRV) unit or an energy recovery ventilator (ERV) unit that receives heat, or heat and humidity, from air that is to be exhausted for use, e.g., in treating fresh air introduced into the unit from the outside.

The oxygen concentrator 200 may be part of the HRV or ERV units.

In some embodiments, the oxygen enrichment apparatus 400 may be a stand-alone unit which only contains an oxygen concentrator 200. Alternately, the oxygen enrichment apparatus 400 may be a room air cleaner, a room air purifier, a room heater, a room air conditioner, a humidifier, a dehumidifier or a combination of one or more thereof which includes an oxygen concentrator 200. Such an oxygen enrichment apparatus 400 may be built in or it may be portable.

Figure 9:
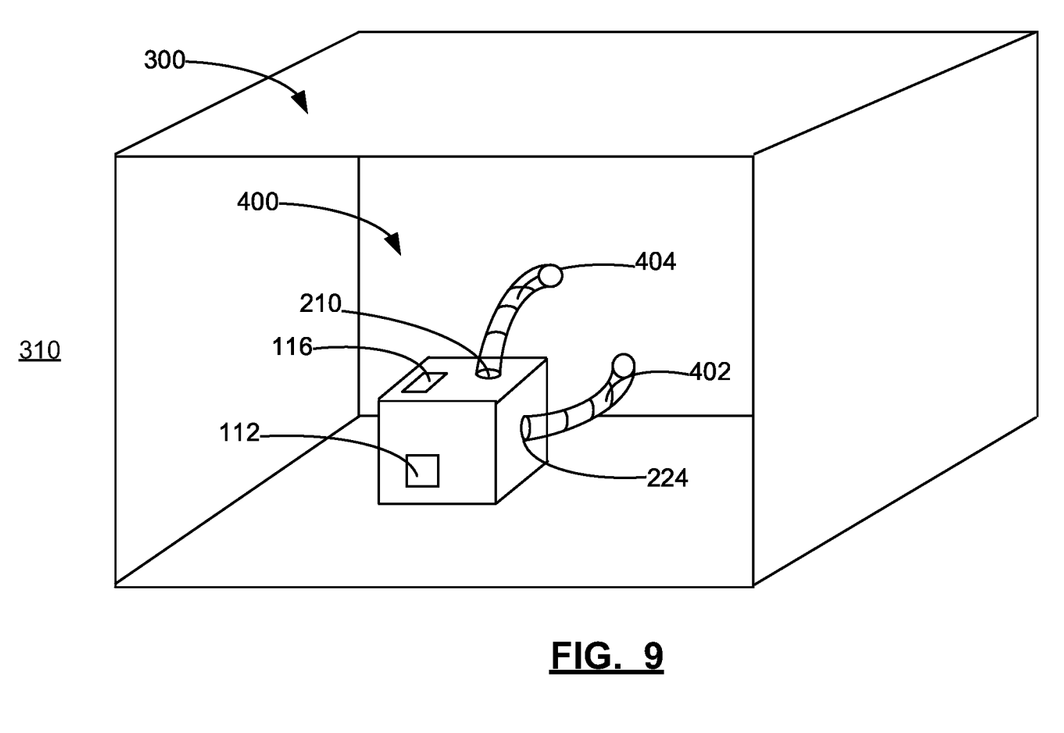

As exemplified in FIG. 9, the oxygen enrichment apparatus 400 may be a portable unit that is positioned in a living space 300. The oxygen enrichment apparatus 400 may operate in the oxygen enrichment mode wherein, as described previously with respect to fan coil 100, some or all of the air that enters inlet 112 is treated to produce an oxygen enriched air stream that is delivered to room 300 via outlet 116. During the oxygen enrichment mode, nitrogen may be adsorbed on a zeolite material.

When sufficient nitrogen has been adsorbed, then the oxygen enrichment apparatus 400 may be operated in the regeneration mode and the nitrogen may be purged via purge vent 224. The oxygen enrichment apparatus 400 may be operated in the regeneration mode when positioned in the room 300. In such a case, the oxygen enrichment apparatus 400 may be in communication with the exterior area 310 by a conduit, e.g., a flexible tube 402, that extends, e.g., through a wall or window of the room 300.

For example, the oxygen enrichment apparatus 400 may be installed on a wall or a window of room 300 using a wall mount and/or a window mount. Mounting the fan coil 100 to a window or wall allows a user to connect an optional fresh air inlet port 210 to the location 310 exterior to the living space 300 via, e.g., a flexible tube 404, that extends, e.g., through a wall or window of the room 300. Similarly, the exhaust air outlet port 220 of the oxygen enrichment apparatus 400 may be connected to the location 310 exterior to the living space 300 via flexible tube 402. This connection allows a user to run the oxygen enrichment apparatus 400 in both the oxygen enriching mode and the regeneration mode without the need to bring the fan coil 100 to the location 310. Accordingly, the oxygen enrichment apparatus 400 may automatically enter the regeneration mode when required. It will be appreciated that such an embodiment may be used with an oxygen concentrator 200 that continuously exhausts oxygen reduced air.

Alternately or in addition, the oxygen enrichment apparatus 400 may be transported (e.g., carried) to the exterior area 310 when the oxygen enrichment apparatus 400 is to be run in the regeneration mode. In other words, to purge the nitrogen that was adsorbed by the oxygen concentrator 200, a user may bring the oxygen enrichment apparatus 400 out of the living space 300 to release the nitrogen. It will be appreciated that, when in the regeneration mode, the nitrogen may be purged from the air outlet 116 or may be purged through a purge vent 224.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples but should be given the broadest interpretation consistent with the description as a whole.

The invention claimed is:

1. An HVAC system comprising:
   a) a fan coil having an exhaust air outlet port through which exhaust air exits the fan coil and an air inlet port through which input air enters the fan coil; and,
   b) an oxygen concentrator operable in an oxygen enrichment mode to transfer oxygen from the exhaust air and deliver the oxygen to the input air
wherein the oxygen concentrator receives a bleed stream of the exhaust air.

2. The HVAC system of claim 1 wherein the oxygen concentrator is a regenerable oxygen concentrator.

3. The HVAC system of claim 2 wherein the oxygen concentrator is a pressure swing adsorption oxygen concentrator.

4. The HVAC system of claim 3 wherein, in the oxygen enrichment mode, the oxygen concentrator adsorbs nitrogen from the exhaust air using a molecular sieve thereby providing oxygen enriched air and the oxygen enriched air is combined with the input air.

5. The HVAC system of claim 4 wherein the oxygen concentrator is also operable in a regeneration mode wherein the nitrogen is desorbed from the molecular sieve.

6. The HVAC system of claim 1 wherein fan coil is part of a HRV or ERV unit and the oxygen concentrator is part of the HRV or ERV unit.

7. The HVAC system of claim 1 further comprising an oxygen sensor operably connected to the oxygen concentrator whereby the oxygen concentrator is actuated when the oxygen sensor detects an oxygen level below a predetermined level.

8. The HVAC system of claim 7 wherein the oxygen sensor is operatively connected to the oxygen concentrator whereby the oxygen concentrator is deactivated when detects an oxygen level above a predetermined level.

9. The HVAC system of claim 1 wherein the oxygen concentrator is connected in flow communication with the exhaust air outlet port and the air inlet port.

10. The HVAC system of claim 1 wherein the fan coil includes a heat exchanger, and the oxygen concentrator is connected in flow communication with the input air upstream of the heat exchanger.

11. The HVAC system of claim 1 further comprising a filter positioned upstream of the oxygen concentrator.

12. An air treatment apparatus for an enclosed living space comprising:
   a) an air inlet conduit through which input air from a source exterior to the living space enters the air treatment apparatus and, after passing through the air treatment apparatus, enters the living space, an air outlet conduit through which air from the living space, after passing through the air treatment apparatus, exits the air treatment apparatus to a location exterior to the living space, b) an oxygen concentrator and c) an air moving member, wherein the oxygen concentrator is operable in an oxygen enrichment mode in which nitrogen is removed from the air from the living space and oxygen enriched air enters the living space and the oxygen concentrator is also operable in a regeneration mode wherein the nitrogen that was removed by the oxygen concentrator from the air from the living space is exhausted through the air outlet conduit to the location exterior to the living space.

13. The air treatment apparatus of claim 12 wherein the apparatus is portable whereby the apparatus is operated in the oxygen enrichment mode when located in the living space and the apparatus is operated in the regeneration mode when located exterior to the living space.

14. The air treatment apparatus of claim 12 further comprising a filter positioned upstream of the oxygen concentrator.

15. The air treatment apparatus of claim 12 further comprising a wall mount or a window mount.

\* \* \* \* \*